United States Patent Office 3,242,881
Patented Mar. 29, 1966

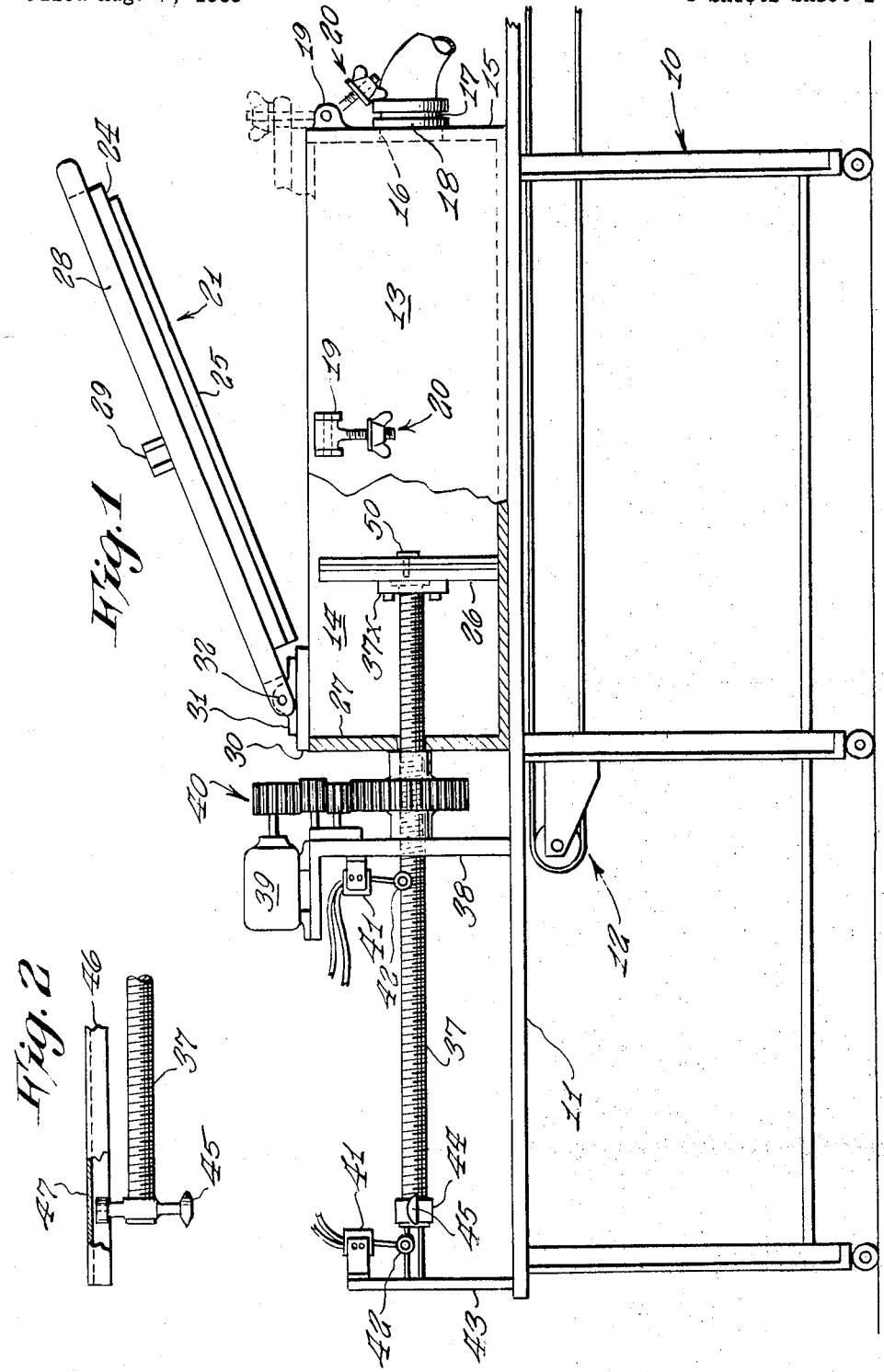

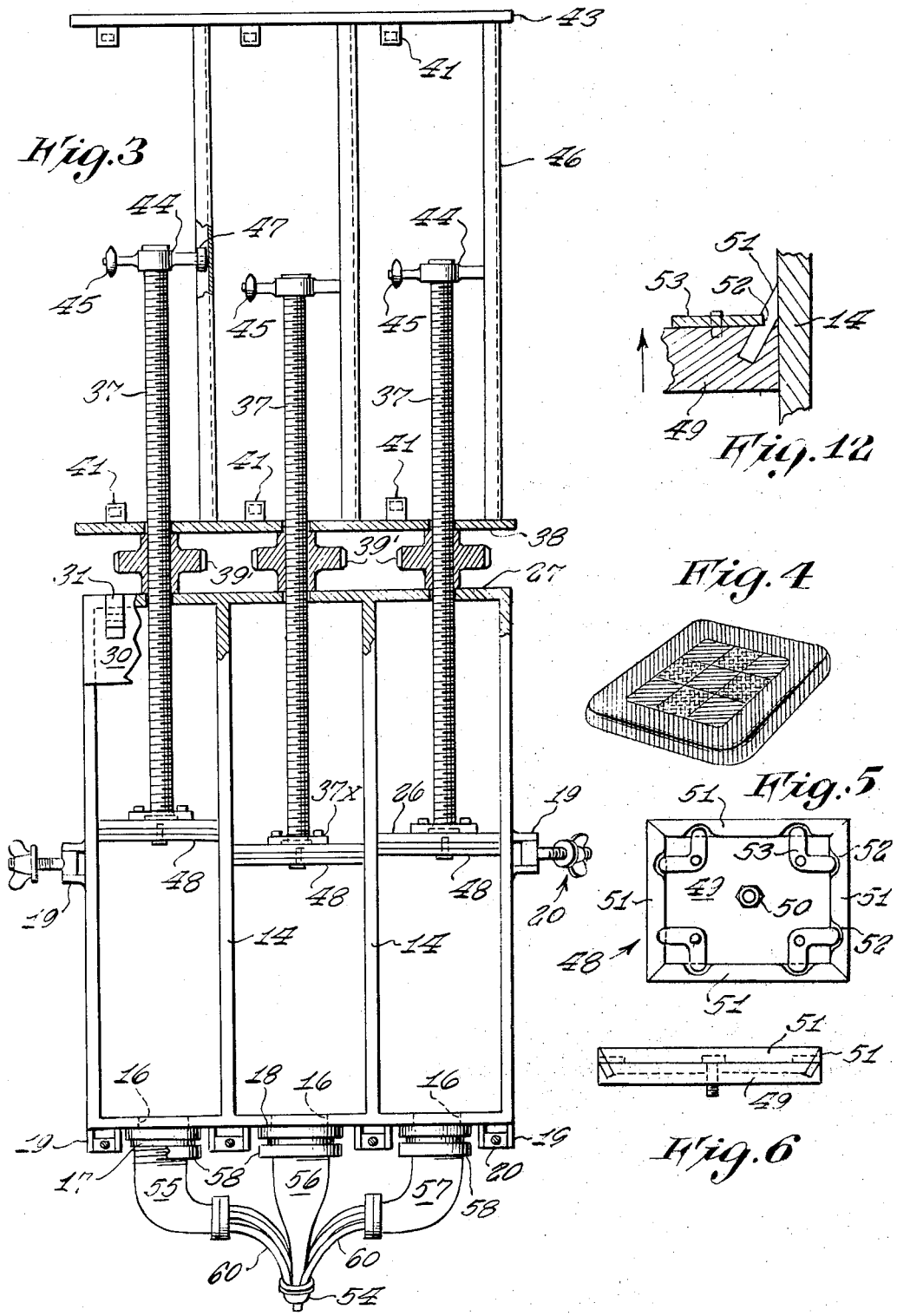

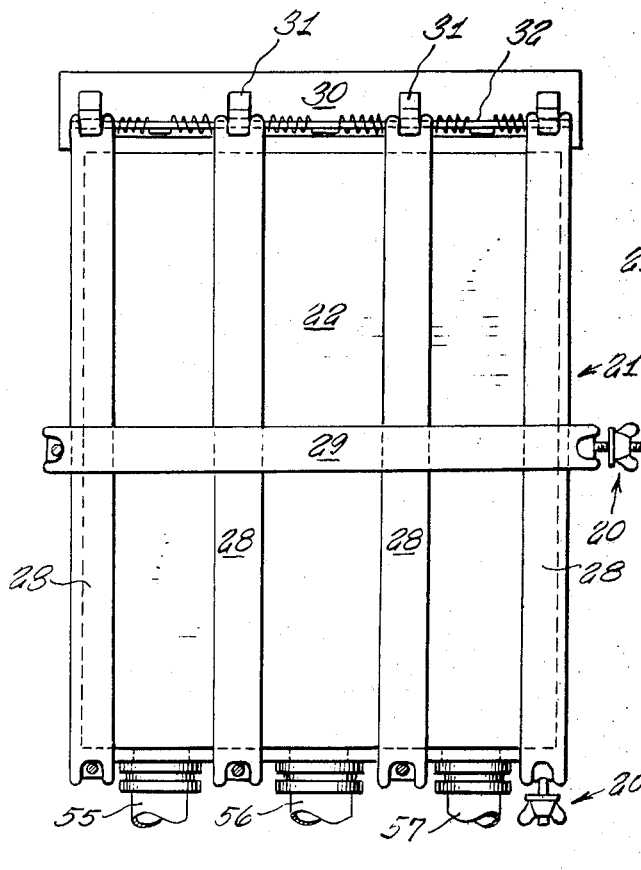
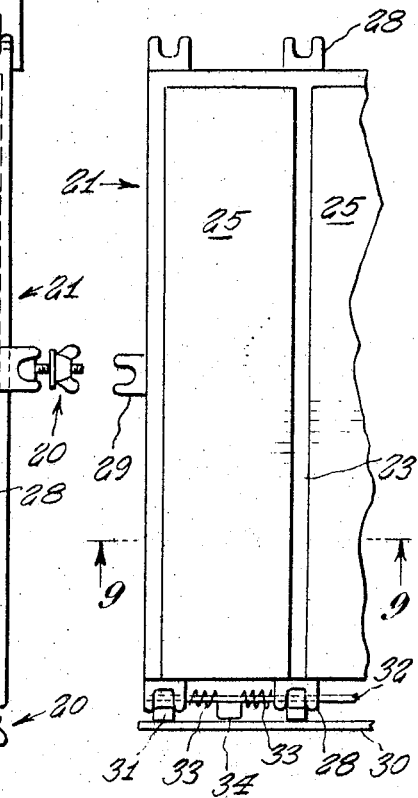
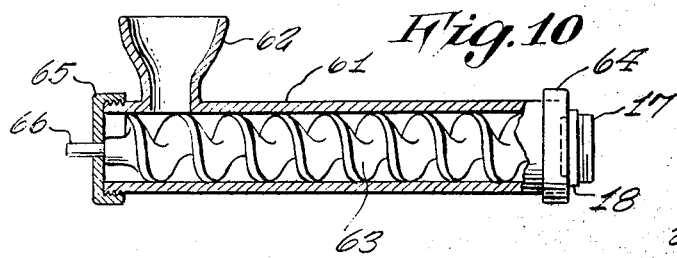
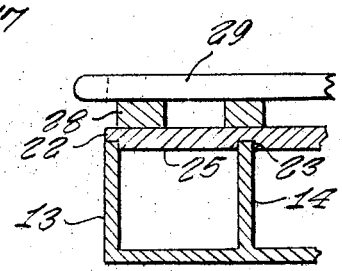
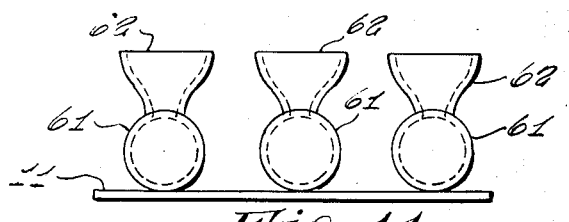

3,242,881
PATTERNED PASTRY MAKING MACHINE
Leonhard Schafer, 219 Miriam St., Bronx, N.Y.
Filed Aug. 7, 1963, Ser. No. 300,538
2 Claims. (Cl. 107—1)

This invention relates to a pastry dispensing machine and more particularly to a machine for intermingling under pressure a plurality of plastic pastry whereby a single bar of pastry of predetermined cross-section design is produced.

It is an object of this invention to provide a machine whereby one or more batches of plastic pastry are each selectively squeezed through respective apertures in said machine.

It is another object to provide a machine of sturdy construction which will withstand the immense pressure necessary to effect plastic flow of batter of a relatively stiff consistency.

It is a further object to provide a machine having a simplicity of construction for the mass production of a continuous interiorly patterned pastry.

It is another object to produce a continuous bar of pastry wherein the bar has a continuous longitudinal pattern whereby it may be transversely sliced to produce cookies having the identical pattern or design.

These and other objects of this invention will become apparent upon reading the following descriptive disclosure taken in conjunction with the illustrative embodiments shown in the accompanying drawings and in which:

FIG. 1 is a side view of the invention disposed on a wheeled carriage having a conveyor secured thereto, said side view being partly in section to show a piston, FIG. 2 is a detailed view broken away in part, showing the means for retaining the microswitch actuating shoe in a horizontal plan, FIG. 3 is a top plan view of the device showing the three compartmented container for retaining three different pastry color compositions, said view having the cover plate removed and being broken away in part to show details of construction, said view being provided with suitable die means at the three exit apertures of the said compartments, FIG. 4 is a transverse perspective view of a cookie made by the dies of FIG. 3, FIG. 5 is a front view of a scraper plate which is attached to a piston or plunger located in each compartment to effect a firm contact with the compartment walls, FIG. 6 is an end view of the scraper plate, FIG. 7 is a top view of the cover plate disposed over the container.

FIG. 8 is a partial view of the inside of the cover plate, showing the manner of hingedly securing it to the container and of the manner of opening it with the aid of a plurality of coil springs, FIG. 9 is a section view taken substantially on line 9—9 of FIG. 8, FIG. 10 is a section of a modified apparatus wherein continuously fed pastry is propelled to each compartment aperture, FIG. 11 is a front view of the device of FIG. 10, and FIG. 12 is a detailed section view, broken-away in part, of a scraper plate showing the manner of a blade engaging a compartment wall, so that increased pressure of the pastry on the blade forces the moving blade to contact the compartment wall with increasing pressure.

The production of cookies of intricate interior design is very difficult to accomplish by hand. Where the design is very involved it is impossible to produce such patterns by hand. Thus where a round or square cookie having an inlaid or mosaic center is desired as shown in FIG. 4, a plurality of conduits from a die lead predeterminedly to two separate compartments of the container and yield the interior mosaic checkerboard pattern whereas the pastry of the central compartment is led to the die and disposed therein so as to form the continuous border of the continuously extruded plastic pastry mass.

By use of various dies adapted to receive three streams of plastic pastry, various predetermined patterns may be continuously extruded.

Thus, for example, a pastry bar carrying an interior mosaic reading Happy Birthday or Merry Christmas and the like may be prepared which upon transverse slicing into wafers of suitable thinness become cookies ready for baking.

Turning now to the drawings and specifically to FIGS. 1 to 3 inclusive, a wheeled carriage 10 of suitable strength and rigidity is provided with a flat top element 11 and a conventional conveyor 12 actuated by an electrical motor (not shown).

A rectangular container 13 of suitable height and length and made of rigid relatively thick stainless steel construction to withstand high pressures is provided with a pair of interior fixed walls 14 thereby providing the container with three rectangular compartments. These compartments are provided each for receiving a pastry batter of different color or other qualities.

The box or container 13 is provided with a front integral wall 15 having a suitable threaded orifice or aperture 16 leading to each compartment in which a threaded outlet pipe 17 is disposed and secured by a threaded collar 18 to the container front wall 15.

The front wall 15 is provided integrally with four suitably apertured bifurcated brackets 19, each having a journal pin and a freely hinged bolt and wing nut assembly 20. The wing nut itself may be adapted to be hand operated rather than being finger operated, if so desired. Furthermore brackets 19 are integrally secured as by welding to each of the longitudinal sides of the container 13 (FIGS. 1 and 3).

A cover 21 of suitably strong construction is provided with a unitary stainless steel cover plate 22 having a pair of longitudinal grooves 23 of suitable depth to receive the partition walls 14.

Moreover, the sides and front edge of the cover plate 22 are each provided with a suitable recess 24 to receive the respective container longitudinal sides and front wall 15. Thus the cover plate 22 is in effect provided with three integral rectangular protuberances 25, each of which fits snugly into the top of a respective compartment and engages a piston or plunger 26 to be described hereinafter.

The cover plate 21 does not extend to the rear container wall 27 since the plunger 26 does not travel to this extreme position in order to load a compartment with the pastry batter of plastic consistency.

Because of the enormous pressure required to make plastic batter flow in the confined spaces the cover 21 is made to resist such enormous pressure. To obtain this result four heavy metal bars 28 are each bifurcated endwise and the bars are uniformly spaced and welded integrally to the top surface of cover plate 21.

A cross bar 29, also provided with notches on each end, is welded across the middle portion of four longitudinal bars 28 and is thus adapted to receive the bolts 20 disposed on the opposed side longitudinal walls of the container 13.

The cover 21 is secured hingedly to a support plate 30, which is welded to the rear of container 13. A plurality of four journals 31 are welded in suitable spaced relationship to the top of support plate 30. The rear bifurcations of the bars 28 are each provided with suitable perforations to receive an axle 32 disposed therethrough and through the respective journals 31 disposed in said bifurcations.

Suitable integral coil springs 33 having a pair of opposed oppositely spiraled coils are mounted on axle 32 with a depending centrally disposed U-shaped portion 34 contacting and biasing against support plate 30, thereby continuously urging the cover into upward or the open position. A spring 33 is disposed between each successive pair of journals 31.

Each of the chambers of container 13 is provided with a plunger or piston 26 for propelling the pastry batter forwardly in the container. A suitable spirally threaded non-rotating rod 37 is secured by means of a suitable plate 37X to said plunger 26. Each of the spiral threaded portions passes through suitably large apertures disposed in the rear container wall 27 providing a clearance.

As shown in FIG. 1, an upright angle iron support 38 is welded to the carriage plate 11 and extends the width of the container 13. A plurality of three independently controlled electrical motors 39 are secured as by bolts to the horizontal portion of angle iron 38.

A suitable gear 39' is provided with a central aperture having spiral threading therein and engaging the spiral threads of the rod 37. The gear 39' is disposed captively against both the rear wall 27 of the container and the angle iron 38. Thus rotation of the so confined gear 39' causes the non-rotating rod 37 to move accordingly, thereby moving the plunger 26.

A conventional reduction gear train 40 is used to reduce the speed of gear 39' to the desired optimum rotational speed. The amount of travel of each of the plungers 26 is controlled by means of a pair of suitably located microswitches 41, each provided with a movable switch contact blade having a roller 42 thereon. One of the respective pairs of microswitches is secured to the angle iron 38 and the other to a rear support 43, which latter is welded to plate 11.

The end of rod 37 is provided with a dual pronged cap 44, the prongs being disposed in horizontal opposed relationship. One of the prongs is provided with a contact shoe 45, beveled at both ends, in order to contact the wheels 42.

A U-shaped bar 46 is suitably disposed and is secured as by welding between elements 38 and 43. The prong of cap 44 opposed to the shoe 45 carried on the other prong is disposed in the U-shaped bar. This prong is provided with a roller 47 which rides in the horizontally disposed U-channel of bar 46. Thus the shoe 45 is rigidly maintained in a horizontal position and accurately contacts and actuates the respective microswitches.

The device above described is operable for the purposes hereinabove set forth. However, because of the immense pressures needed to force plastic pastry through narrow apertures, there is a small amount of bypass of pastry between the edges of the plunger and its adjacent walls. To prevent even this small loss a scraper plate 48 (FIG. 5) is provided.

The scraper plate 48 is of about the rectangular dimensions of the plunger 36 and comprises a base 49 having a central aperture for receiving a bolt 50 for securing into a plunger 26 having a threaded cavity therein to receive said bolt 50. The four top surfaces of the scraper, are provided with suitably angled channels located in predetermined suitable relationship to the respective scraper edge. A knife blade 51 is disposed in each of the channels. The blades 51 are each provided with suitable cutouts 52 leaving a horizontal surface of metal therein.

A plurality of four L-shaped apertured hold-down plates 53 are secured by bolts in the respective corners of the base 49 and against respective horizontal surfaces of cutouts 52 of adjacent blades 51 (FIG. 12).

In use, the blades 51 each bend or move slightly inwardly thereby effecting knife-edged pressured engagement between a blade 51 and its adjacent chamber wall.

Turning now to FIG. 3, there is shown a die 54 for making pattern pastry and the three conduits 55, 56 and 57 secured by conventional screw threaded collars 58 to the respective threaded orifice pipes 17. The intricacy of manufacture of the dies is another field of invention, suffice it to say that a continuously extruded bar of three colors shown in transverse section in FIG. 4 is one form obtainable by the aid of the use of the invention herein. In the composite bar of FIG. 4, the border or periphery is made from the pastry issuing through conduit 56 and the mosaic checkerboard center is made from the respective colored pastry of the outside chambers issuing through conduits 55 and 57. The tubes 60 are so interlaced as shown in my Patent No. 3,213,808, dated October 26, 1965, as to produce a central checkerboard area.

The device shown in FIGS. 1 to 9 is in effect a batch process, because a confined definite amount of pastry in each chamber is individually pushed out of its respective orifice 16 at its own flow rate. However, the chambers of the container are very large so that a very long length of composite bar is obtainable with one filling of the machine so that the machine may be said to extrude a continuous bar of patterned pastry.

Another and continuous pastry making machine is shown in FIGS. 10 and 11. In this invention, a tubular cylindrical housing 61 is provided with an inlet hopper 62. A suitable spiraled convolute 63 is accurately fitted into the housing to obtain very close or substantially no tolerance between the convolute 63 and tube wall. The front end of the tube is threaded and a threaded cap 64 having an outlet for the moving pastry is secured thereto. The rear of the housing is provided with exteriorly disposed screw threads and a threaded cap 65 is provided with a small central aperture.

A shaft 66 integral with the convolute 63 is passed through the aperture of cap 65 and said cap is then threaded onto the housing. Each shaft 66 is coupled by conventional means to a motor 39. Thus each shaft 66 is independently rotated so that the pastry flow rate of each of the three housings 61 (FIG. 11) may be different and as required in quantity to make a particular bar (FIG. 4) through the use of a die 54 and conduits 55, 56 and 57 secured to respective housings 61.

This invention has been described by means of a plurality of embodiments but being of a generic scope it is not limited to these illustrations:

I claim:

1. An extrusion machine for extruding a plurality of pastry batters of plastic consistency comprising a frame; container means having a plurality of longitudinal compartments disposed on said frame and having a front end wall having outlet apertures therein for permitting passage of propelled batter through said apertures; propelling means movingly disposed in said compartments for propelling pastry batter therein toward said apertures; pastry pattern die means adapted to receive separately the pastry from each compartment and to emit a composite extruded rod having a die pattern; motor means for actuating said propelling means; and conduits connecting each of said outlet apertures to said die means whereby the propelling force of each of said propelling means forces the pastry batter into said respective conduits and thence into and through said die means, said container means being a horizontal rectangular box separated by integral longitudinal partitions into compartments and a hinged cover disposed over said compartments secured to said container means and adapted to form a top compartment wall for each of said compartments, said propelling means being a longitudinally movable plunger disposed in each of said compartments; a spirally threaded rod secured to each plunger; a gear having a spirally grooved aperture to receive said rod, threadingly mounted on said rod; wall means secured to said frame and captively engaging each gear on both ends thereof to prevent longitudinal movement, whereby rotation of said gear moves said rod and plunger longitudinally; cap means having a roller on one side mounted on the end of each rod remote from each plunger; a curved shoe horizontally mounted on the other side of said cap means; U-channel means secured to said wall means and captively engaging said roller; and a pair of microswitches secured in suitable spaced apart relationship to said channel means and adapted for successive operation by each shoe whereby the forward and rearward travel of said plunger is limited by the operation of said microswitches.

2. The machine of claim 1 wherein the propelling means consists of a rectangular plunger and scraper plate of substantially like dimension secured thereto, said scraper plate having suitable angularly disposed channels along each edge, a knife blade disposed in each channel and adapted to slidingly engage a compartment wall and hold down plates for securing said blades to said scraper plate whereby knife edge pressure is exerted by the propelling means upon the compartment walls to prevent bypass of pastry dough.

References Cited by the Examiner

UNITED STATES PATENTS

| | | | |
|---|---|---|---|
| 660,717 | 10/1900 | Barber et al. | 107—1.4 |
| 797,276 | 8/1905 | Glauser | 107—1.4 |
| 1,186,602 | 6/1916 | Perri | 222—390 |
| 1,594,378 | 8/1926 | Prout | 107—14 |
| 1,661,916 | 3/1928 | Allen | 107—1.4 |
| 2,193,147 | 3/1940 | Stricker | 107—1 |
| 2,214,325 | 9/1940 | Gothe | 107—1 |
| 2,708,414 | 5/1955 | Gumer | 107—1.4 |
| 2,762,318 | 9/1956 | Prouty | 107—1.4 |
| 3,142,266 | 7/1964 | Caferro | 107—1 |

WALTER A. SCHEEL, *Primary Examiner.*

ROBERT E. PULFREY, *Examiner.*

JOSEPH SHEA, *Assistant Examiner.*